United States Patent [19]

Warshaw

[11] 3,894,140

[45] July 8, 1975

[54] STABILIZATION OF ALUMINA CATALYST SUPPORTS

[75] Inventor: Abe Warshaw, Matawan, N.J.

[73] Assignee: Chemical Construction Corporation, New York, N.Y.

[22] Filed: May 9, 1973

[21] Appl. No.: 358,707

[52] U.S. Cl. .......... 423/213.5; 423/213.7; 252/462; 252/463; 252/466 J; 252/471
[51] Int. Cl.............................................. B01d 53/34
[58] Field of Search.............. 423/212, 213.5, 213.7; 252/462, 463, 471, 466 B

[56] References Cited
UNITED STATES PATENTS

| | | | |
|---|---|---|---|
| 3,230,182 | 1/1966 | Stiles................................ | 423/213.5 |
| 3,444,098 | 5/1969 | Bottazi et al.................... | 423/212 X |
| 3,513,109 | 5/1970 | Stiles............................ | 423/213.2 X |
| 3,524,721 | 8/1970 | Stephens......................... | 423/213.5 |
| 3,676,370 | 7/1972 | Stephens...................... | 423/213.2 X |
| 3,699,683 | 10/1972 | Tourtellotte et al......... | 423/213.5 X |
| 3,737,396 | 6/1973 | Negra et al. ................. | 423/213.5 X |
| 3,781,406 | 12/1973 | Roth et al. ...................... | 423/213.2 |

FOREIGN PATENTS OR APPLICATIONS 973,565  10/1964  United Kingdom

*Primary Examiner*—G. O. Peters
*Attorney, Agent, or Firm*—J. L. Chaboty

[57] ABSTRACT

Engine exhaust gas is treated to remove noxious components by contacting the exhaust gas with an active catalytic agent deposited on alumina which has been stabilized by the inclusion of at least two metallic additives selected from the group consisting of thorium, a rare earth metal, and an alkaline earth metal.

17 Claims, No Drawings

3,894,140

STABILIZATION OF ALUMINA CATALYST SUPPORTS

BACKGROUND OF THE INVENTION

1. Field of the Invention

The invention relates to an improved catalyst composition and the process of treating engine exhaust gas using the improved catalyst composition. The invention especially relates to the elimination of deleterious compounds such as nitrogen oxides, carbon monoxide and residual hydrocarbons, which are present in the exhaust gas from engines provided for vehicles such as automobiles, trucks, buses, motorcycles and tractors. The invention prevents the discharge of these noxious components into the atmosphere, and thereby prevents air pollution. Application of the invention to engines in general will be understood to encompass other types of combustion devices and engines such as gas turbines, diesel engines and the like.

2. Description of the Prior Art

In recent years it has been recognized that the exhaust gas discharged from internal combustion engines is a serious source of air pollution, especially in metropolitan areas. In some cases, a so-called smog is generated due to atmospheric inversions and accumulation of such exhaust gases in the atmosphere. Recent attempts to prevent such air pollution have concentrated on the destruction or elimination of noxious components by catalysis, especially by catalytic reduction of nitrogen oxides followed by admixture of secondary air into the exhaust gas and catalytic oxidation of residual hydrocarbons, carbon monoxide, etc., in various types of apparatus especially designed for this purpose. Improvements in active catalytic agents for this function are described in U.S. Pat. Nos. 3,053,773; 3,310,366; 3,316,057; 3,429,656; 3,476,508; 3,701,822 and 3,714,071; and U.S. Pat. Application No. 196,204 filed Nov. 5, 1971 now U.S. Pat. No. 3,740,349. Copper-bearing catalysts are generally described in U.S. Pat. Nos. 2,025,140; 3,133,029; 3,398,101; 3,447,893; 3,493,325, and U.S. Pat. Application Nos. 180,108 filed July 17, 1971 now U.S. Pat. No. 3,737,396; 226,296 filed Feb. 14, 1972; 237,516 filed Mar. 23, 1972 and now U.S. Pat. No. 3,840,642 and 241,441 filed Apr. 5, 1972. Two-stage apparatus for carrying out the process with interstage air injection is described in U.S. Pat. No. 3,656,915 and allowed U.S. Pat. Application Nos. 143,401 filed May 14, 1971 now U.S. Pat. No. 3,733,818 and 186,859 filed Oct. 6, 1971 now U.S. Pat. No. 3,736,105. The incorporation of foreign ions into alumina, so as to produce an improved thermostable catalyst carrier, is generally described in U.S. Pat. No. 2,422,172 and Monat. Chem. 99, 1,733–41 (1968).

One of the major practical problems associated with catalytic devices and mufflers is related to the catalyst carriers or support material, and involves attrition or structural degradation of the solid particulate catalyst caused by high temperature operation, thermal stresses due to temperature changes in service, and/or expansion and contraction of the catalyst container. The stresses generated due to the cycling of the process and attendant thermal expansion and contraction are very difficult to control by means of configuration design and through increased crush strength catalyst carrier. Common carriers or support material are aluminates, silicates, etc., in pelleted and/or monolithic ceramic forms. Crush strengths may vary from a few pounds per square inch to over 100 pounds per square inch.

SUMMARY OF THE INVENTION

In the present invention, it has been determined that a catalytic formulation characterized by the provision of alumina as the catalyst support or carrier may be substantially improved, when the alumina catalyst support is stabilized by the inclusion of at least two metallic additives selected from the group consisting of thorium, a rare earth metal, and an alkaline earth metal. A preferred process environment for application of the catalyst formulation is in the treatment of exhaust gas discharged from an engine to remove noxious components. Typical and preferred catalytic base metals such as copper, cobalt and manganese in combination are deposited on the stabilized alumina, which is generally a porous form of alumina such as beta, gamma or transitional alumina, which has been stabilized by the inclusion of a small but effective amount of typically 0.1% to 10% and preferably 1% to 5% of each metallic additive. The catalytic base metals, which in combination form the active catalytic agent, are deposited on the stabilized alumina in the form of crystals from a dilute salts solution, and resultant catalyst is highly effective for exhaust gas treatment. The stabilized alumina as the carrier for the catalytically effective metals is applicable in single and dual bed catalytic converters which use pellet or particle type catalyst.

In summary, in the present invention an activated alumina which is thermodynamically unstable is converted to a stable form by treatment with certain metal salts which may also become catalytically active after conversion to their oxide forms. This invention relates to the treatment of activated alumina catalyst support materials that become inactivated or lose their resistance to attrition after subjection to high temperatures. Combinations of rare earth and alkaline earth salts have proven to be particularly suitable for stabilizing unstable alumina catalyst support material prior to incorporation of catalytically active metal oxides, for the purpose of eliminating noxious components of exhaust gases from internal combustion engines. Although a very large number of rare and alkaline earth metal combinations may be used, a preferred combination of this invention is cerium and calcium, together with thorium, all in the form of their oxides. This combination has proven singularly effective in promoting outstanding improvement in resistance against attrition while retaining high catalytic activity even when subjected to temperatures in excess of 1,000°C for a prolonged period. It has not been found necessary to utilize all three metals in any single formulation. Combination of any two of the three has proven equally suitable.

The main advantage of the present invention is the improved durability of the catalyst in practical application, and an extension of active catalyst life by the prevention of attrition, thermal degradation, or loss of catalyst activity in application, as contrasted to prior art catalyst formulations which in practice are rapidly degraded or disintegrated, with attendant grinding and powdering of the catalyst particles, leading to rapid loss of catalytic material as a fine dust or powder which is blown out of the container or catalytic muffler and discharged from the system through the tailpipe or other exhaust appurtenances.

In accordance with the present invention, the alumina carrier is typically a porous from of alumina such as beta, gamma or transitional alumina, which has been stabilized by the inclusion of at least two metallic additives in the porous crystal lattice or interstices. The range of at least two metallic additives acting in synergistic combination is necessary in order to achieve the improved results of the present invention, however the two metallic additives are selected from a group of three classes of additives, i.e. thorium, a rare earth metal, and an alkaline earth metal. In other words, within the scope of the present invention, usable combinations of metallic additives include thorium and a rare earth metal; thorium and an alkaline earth metal; a rare earth metal and an alkaline earth metal; and finally the combination of all three types of additives, thorium and a rare earth metal and an alkaline earth metal, of which the combination of thorium, cerium and calcium is exemplary. Other rare earth metals besides cerium may be employed, and in addition the other alkaline earth metals barium and strontium may be employed instead of calcium.

The preferred active catalytic agent of the present invention is a catalytic formulation of copper, cobalt and manganese in combination. The formulation typically contains, as % by weight of the solid catalyst particles, 8% to 20% by weight of copper expressed as copper oxide, 1% to 5% by weight of cobalt expressed as cobalt oxide, and 0.5% to 3% by weight of manganese expressed as manganese dioxide, with these metals being deposited as salts on stabilized alumina which has been prepared by dispersing at least two metallic additives as described supra into the porous alumina structure.

The deposition of the catalytically active metals on the stabilized alumina provides a highly effective catalyst for treating exhaust gases from engines such as internal combustion engines or the like, in order to reduce nitrogen oxides to nitrogen, and also to oxidize carbon monoxide and residual or thermally degraded vaporous hydrocarbons to carbon dioxide and water vapor. The catalyst may also contain 1% to 5% nickel as equivalent nickel oxide. The copper will generally be present as $CuO$, the cobalt will generally be present as $Co_2O_3$, and the manganese will generally be present as $MnO_2$, however these metals may be at least partially present as reduced oxides or in the metallic state. Similar considerations apply to nickel, when present. In the description and claims infra, catalyst composition will refer to these catalytic components in terms of equivalent oxide content, however the copper and cobalt may be partially present in actuality as other compounds or as reduced elemental metals or in the metallic state. However, equivalent oxide composition in accordance with the formulas supra is reported on analysis, as is customary in the art.

The exhaust gas containing a small proportion of free oxygen may be passed through a single bed catalytic converter containing discrete particles of the catalyst formulation of the present invention. In other instances and in a preferred embodiment, the exhaust gas is passed through two catalyst beds or masses in series, and air is injected into the partially reacted gas between the beds or stages, so that the initial bed functions as a reducing medium to eliminate nitrogen oxides and the final bed acts as an oxidizing catalysis agent to oxidize carbon monoxide and residual hydrocarbon vapors. It has been determined that highly beneficial results are thereby attained, in terms of removal of nitrogen oxides from the exhaust gas by reduction, and removal of carbon monoxide and hydrocarbon vapors by oxidation. The invention is preferably practiced in this exhaust gas treatment process by providing two catalyst beds in series, with series flow of exhaust gas taking place through the two beds. Air which may be preheated is injected into the partially reacted exhaust gas between beds. Typical apparatus arrangements for carrying out the process are described in U.S. Pat. No. 3,656,915 and allowed U.S. Patent Application Nos. 143,401 filed May 14, 1971 now U.S. Pat. No. 3,733,181 and 186,859 filed October 6, 1971 now U.S. Pat. No. 3,736,105. A temperature level generally in the range of 200° to 800°C will usually be provided in the catalyst beds during reaction, however the invention may be practiced at lower temperatures, such as when starting a cold automobile engine, or at temperatures above 800°C.

It is an object of the present invention to provide an improved process and catalyst for treating exhaust gases from engines to remove noxious components.

Another object is to prevent air pollution due to the discharge of exhaust gas from engines such an internal combustion engine.

A further object is to provide an improved process and catalyst for catalytically reducing nitrogen oxides and oxidizing carbon monoxide and hydrocarbon vapor in the exhaust gas from an internal combustion engine.

An additional object is to provide a combination of specific proportions of copper, cobalt and manganese together with optional nickel, deposited on stabilized alumina carrier, in a catalyst composition for treating the exhaust gas from internal combustion engines.

Still another object is to provide an improved alumina carrier for catalytically active agents employed in a catalyst formulation.

Still a further object is to provide a stabilized alumina carrier for a catalyst formulation which resists attrition, abrasion, and thermal degradation and/or inactivation, and which may be usefully employed for extended periods of time in a container or catalytic converter which is subject to cyclic thermal deformation, such as alternate expansion and contraction.

Still another object is to stabilize alumina, so that the alumina may be usefully employed as a catalyst carrier, by the inclusion in the alumina of a small but effective amount of at least two metallic additives selected from the group consisting of thorium, a rare earth metal and an alkaline earth metal.

These and other objects and advantages of the present invention will become evident from the description which follows.

DESCRIPTION OF THE PREFERRED EMBODIMENTS AND EXAMPLES

PREPARATION OF THE THORIUM-CERIUM STABILIZED CATALYST (EXAMPLE NO. 1)

8,000 grams of ⅛ inch transitional alumina spheres or extrudates are immersed in 12 liters of a solution containing 900 grams of Thorium Nitrate and 100 grams of Ceric Ammonium Nitrate.

After one hour, with occasional mixing, the liquid is removed and the spheres or extrudates dried at 800° F. for 16 hours.

The dried product is then transferred to a muffle furnace and heat treated at 1600°–1700°F. for 3 or more hours.

After cooling to room temperature the treated material is immersed in 16 liters of a solution containing:

| | |
|---|---|
| Copper Nitrate | 3,000 grams |
| Cobalt Nitrate | 1,200 grams |
| Manganous Nitrate | 400 grams |
| Ammonium Nitrate | 200 grams |

After one hour immersion the liquid is removed and the catalyst is dried for 16 hours at 800° F.

After cooling the catalyst may be again immersed in the metal nitrates solution and again dried at 800° F. for 16 hours.

The catalyst is then conditioned at 1530°–1600° F for at least three hours and after cooling may be transferred to a catalytic converter and connected to a source of gaseous pollution.

As an example, a two stage converter was filled with the catalyst and attached to a standard eight cylinder engine. The engine was run under the conditions prescribed by Federal Test procedure CVS II. A comparison of the results obtained with and without the stabilization step shows the superior characteristics of the stabilized catalyst over the unstabilized.

| | Stabilized ($ThO_2$ $CeO_2$) Catalyst | | | Unstabilized Catalyst | | |
|---|---|---|---|---|---|---|
| | 1 | 2 | 3 | 1 | 2 | 3 |
| Lbs. Crush Strength | 18.1 | 20.3 | 17.2 | 12.1 | 12.5 | 12.4 |
| % Attrition | 3.3 | 3.0 | 2.0 | 19.3 | 18.7 | 18.1 |
| Grams/Mile Nitrogen Oxides | 0.21 | 0.30 | 0.33 | 0.24 | 0.23 | 0.21 |
| Grams/Mile Carbon Monoxide | 1.43 | 1.54 | 1.31 | 1.89 | 1.72 | 1.54 |
| Grams/Mile Hydrocarbons | 0.17 | 0.12 | 0.12 | 0.18 | 0.19 | 0.20 |
| % Shrinkage (1600–1800°F) | | 3.3 | | | 17.3 | |

Although the unstabilized catalyst shows good activity, the stabilizing metals impart definite improvements; well below 1975–1976 automotive exhaust requirements, the stabilized catalyst is far superior in attrition resistance, crush strength and shrinkage. Bulk densities were scarcely altered by the stabilization.

The ability of a catalyst to resist high temperature degradation, shrinkage, and attrition while maintaining high activity is essential for extended trouble-free performance of a catalytic converter.

Typical analysis of a ThO-CeO stabilized catalyst:

| | |
|---|---|
| % Copper as CuO | 9.44 |
| % Cobalt as $Co_2O_3$ | 1.89 |
| % Manganese as $MnO_2$ | 1.05 |
| % Thorium as $ThO_2$ | 1.90 |
| % Cerium as $CeO_2$ | 0.15 |

EXAMPLE NO. 2

Bench scale tests were made on a calcium oxide-ceric oxide stabilized catalyst. This catalyst was evaluated as to its low-temperature oxidizing ability towards carbon monoxide and gaseous hydrocarbons. The temperature at which 50% of these pollutants were converted to nonpolluting gases was established and compared to an active unstabilized catalyst. Comparison of crush strength, attrition and shrinkage was also made.

| | Stabilized (CaO $CeO_2$) Catalyst | Unstabilized Catalyst |
|---|---|---|
| Temp. required for 50% CO Removal | 333°F | 338°F |
| Temp. required for 50% HC Removal | 392°F | 405°F |
| Lbs. Crush Strength | 22.0 | 15.4 |
| % Attrition | 3.3 | 18.1 |
| % Shrinkage (1600–1800 Deg. F) | 0.5 | 9.3 |
| Bulk density (lbs./ft.$^3$) | 42 | 41 |

The stabilized catalyst showed no evidence of loss in activity or appreciable deterioration in extended tests.

| Typical Analysis of CaO-$CeO_2$ Stabilized Catalyst | |
|---|---|
| % Copper as CuO | 13.75 |
| % Cobalt as $Co_2O_3$ | 2.64 |
| % Manganese as $MnO_2$ | 1.26 |
| % Ca as CaO | 1.18 |
| % Ce as $CeO_2$ | 0.21 |

EXAMPLE NO. 3

$ThO_2$-CaO Stabilized Catalyst

The method of preparation was the same as in Example No. 1.

Bench scale tests were made as in Example No. 2.

This catalyst was also compared to the standard unstabilized catalyst shown in Example No. 2 for activity, crush strength, resistance to attrition and shrinkage.

| | |
|---|---|
| Temperature required for 50% CO Removal | 320 Deg. F |
| Temperature required for 50% HC Removal | 365 Deg. F |
| Lbs. Crush strength | 18.5 |
| % Attrition | 2.9 |
| % Shrinkage | 4.2 |

The ability of this catalyst to oxidize carbon monoxide and hydrocarbons compared favorably to any of the active unstabilized catalysts tested.

The metals chosen for their stabilizing ability have the added attraction of imparting enhanced activity of an otherwise quite adequate oxidation-reduction type catalyst.

EXAMPLE NO. 4

Two stabilized catalysts and one unstabilized catalyst were exposed to 1,800° F. for 24 hours. Activity of the stabilized catalysts was not materially affected by the heat treatment, but the unstabilized catalyst showed a marked decrease in activity for oxidation of carbon monoxide and hydrocarbons.

| Catalyst | Temp. for 50% CO Conversion | Temp. for 50% HC Conversion |
|---|---|---|
| Stabilized Th-Ce | 297 | 345 |
| Stabilized Ca-Ce | 338 | 392 |
| Unstabilized | 480 | 549 |

The stabilization techniques described in this patent prevent deactivation of the prescribed catalysts even when subjected to unusually high temperatures.

Catalysts not exposed to temperatures above 800° F. show carbon monoxide and hydrocarbon conversions at 200° to 250° F.

I claim:

1. In a process for the treatment of exhaust gas from an engine to eliminate noxious components selected from the group consisting of nitrogen oxides, carbon monoxide and hydrocarbons which comprises passing an exhaust gas through at least one stage of catalysis, the improvement comprising wherein said catalysis stage contains solid catalyst particles comprising an active catalytic agent deposited on particles of transitional alumina, said active catalytic agent comprising copper, cobalt and manganese, said transitional alumina particles being stabilized by the inclusion in said transitional alumina particles of at least two metallic additives selected from the group consisting of thorium, a rare earth metal, and an alkaline earth metal, whereby a treated exhaust gas of depleted content of noxious components is discharged from said catalysis stage.

2. The process of claim 1, in which the number of catalysis stages is two, said exhaust gas is passed through the first and second catalysis stages in series, and air is injected into the partially reacted exhaust gas between catalysis stages, whereby nitrogen oxides contained in said exhaust gas are catalytically reduced in the first catalysis stage and carbon monoxide and hydrocarbons contained in said exhaust gas are catalytically oxidized in the second catalysis stage.

3. The process of claim 1, in which said metallic additives are selected from the group consisting of thorium, cerium and calcium.

4. The process of claim 1, in which said active catalytic agent contains nickel.

5. The process of claim 1, in which said engine is an internal combustion engine mounted in a vehicle.

6. The process of claim 1, in which said exhaust gas is contacted with solid catalyst particles in said catalysis stage at a temperature in the range of 200° to 800°C.

7. In a process for the treatment of exhaust gas from an engine to eliminate noxious components selected from the group consisting of nitrogen oxides, carbon monoxide and hydrocarbons which comprises passing an exhaust gas through at least one stage of catalysis, the improvement comprising wherein said catalysis stage contains solid catalyst particles comprising an active catalytic agent deposited on particles of transitional alumina, said active catalytic agent comprising copper expressed as copper oxide in the range of 8% to 20% by weight of said solid catalyst particles, cobalt expressed as cobalt oxide in the range of 1% to 5% by weight of said solid catalyst particles, and manganese expressed as manganese dioxide in the range of 0.5% to 3% by weight of said solid catalyst particles, said transitional alumina particles being stabilized by the inclusion in said transitional alumina particles of at least two metallic additives selected from the group consisting of thorium, a rare earth metal, and an alkaline earth metal, each metallic additive being present in said transitional alumina particles in a proportion in the range of about 0.1% to 10% by weight of said transitional alumina particles, whereby a treated exhaust gas of depleted content of noxious components is discharged from said catalysis stage.

8. The process of claim 7, in which said solid catalyst particles contain copper in the range of 15% to 18% by weight of equivalent copper oxide, cobalt in the range of 2.5% to 4% by weight of equivalent cobalt oxide, manganese in the range of 1% to 2% by weight of equivalent manganese dioxide, and each metallic additive in a proportion in the range of 1% to 5% by weight of said transitional alumina particles.

9. The process of claim 7, in which said solid catalyst particles contain nickel in the range of 1% to 5% by weight of equivalent nickel oxide.

10. The process of claim 7, in which said engine is an internal combustion engine mounted in a vehicle.

11. The process of claim 7, in which said exhaust gas is contacted with solid catalyst particles in said catalysis stage at a temperature in the range of 200° to 800°C.

12. The process of claim 7, in which the number of catalysis stages is two, said exhaust gas is passed through the first and second catalysis stages in series, and air is injected into the partially reacted exhaust gas between catalysis stages, whereby nitrogen oxides contained in said exhaust gas are catalytically reduced in the first catalysis stage and carbon monoxide and hydrocarbons contained in said exhaust gas are catalytically oxidized in the second catalysis stage.

13. The process of claim 7, in which said metallic additives are selected from the group consisting of thorium, cerium and calcium.

14. A catalyst composition for the treatment of exhaust gas from an engine to eliminate noxious components selected from the group consisting of nitrogen oxides, carbon monoxide and hydrocarbons comprising copper, cobalt and manganese deposited on particles of transitional alumina, said transitional alumina particles being stabilized by the inclusion in said transitional alumina particles of at least two metallic additives selected from the group consisting of thorium, a rare earth metal, and an alkaline earth metal, each metallic additive being present in a proportion in the range of about 0.1% to 10% by weight of said transitional alumina particles.

15. The composition of claim 14, in which said composition contains nickel.

16. The composition of claim 14, in which said metallic additives are selected from the group consisting of thorium, cerium and calcium.

17. The composition of claim 14, in which each metallic additive is present in said transitional alumina particles in a proportion in the range of about 1% to 5% by weight of said transitional alumina particles.

* * * * *